United States Patent [19]

Willard

[11] Patent Number: 5,299,670

[45] Date of Patent: Apr. 5, 1994

[54] TELEPHONE CORD REEL

[76] Inventor: Warren L. Willard, R.R. 4, Box 85, Charleston, Ill. 61920

[21] Appl. No.: 76,552

[22] Filed: Jun. 11, 1993

[51] Int. Cl.⁵ .......................................... H02G 11/02
[52] U.S. Cl. .............................. 191/12.2 R; 191/12.4; 379/438
[58] Field of Search ........... 191/12 R, 12.2 R, 12.2 A, 191/12.4; 379/437, 438; 242/107.3, 107.4 R, 107.7

[56] References Cited

U.S. PATENT DOCUMENTS

| | | | |
|---|---|---|---|
| 538,095 | 4/1895 | Aitchison | 191/12.2 R |
| 1,024,417 | 4/1912 | Pagnod | 191/12.2 R |
| 1,159,124 | 11/1915 | Steen | 191/12.2 R |
| 1,243,039 | 10/1917 | Carroll et al. | 191/12.4 |
| 1,397,633 | 11/1921 | Hite | 191/12.2 R |
| 2,270,997 | 1/1942 | Davis | 191/12.4 |
| 2,587,707 | 3/1952 | Dever | 191/12.2 R |
| 2,611,834 | 9/1952 | Simons | 191/12.4 |
| 2,678,779 | 5/1954 | Bellmer | 191/12.2 R |
| 3,128,857 | 4/1964 | Walton | 191/12.2 R |
| 3,144,218 | 8/1964 | Tepe | 191/12.2 A X |
| 3,147,833 | 9/1964 | McWilliams | 191/12.4 |
| 3,373,954 | 3/1968 | Hilsinger, Jr. | 191/12 R X |
| 3,743,796 | 7/1973 | Rosenscrantz | 191/12.2 A |
| 3,806,671 | 4/1974 | Anderson | 191/12.2 R |
| 3,953,688 | 4/1976 | Rocha | 379/438 X |
| 4,073,449 | 2/1978 | Pilat | 191/12.4 X |
| 4,646,987 | 3/1987 | Peterson | 191/12.2 R X |
| 4,946,010 | 8/1990 | DiBono | 191/12.2 R |
| 5,117,456 | 5/1992 | Aurness et al. | 191/12.2 R X |
| 5,241,593 | 8/1993 | Wagner | 379/438 |

FOREIGN PATENT DOCUMENTS

| | | | |
|---|---|---|---|
| 555484 | 6/1977 | U.S.S.R. | 191/12.2 R |
| 860192 | 8/1981 | U.S.S.R. | 191/12.2 A |

Primary Examiner—Michael S. Huppert
Assistant Examiner—Scott L. Lowe
Attorney, Agent, or Firm—Philip L. Bateman

[57] ABSTRACT

A telephone cord reel is particularly suited for use in airplanes, motor vehicles, and other places where space is limited. The reel contains a section of telephone cord and a hollow, cylindrical spool having helical channels around which the cord winds. The reel also contains a cord guide assembly having a track-mounted cord guide with a protrusion which engages the helical channels of the spool such that the cord guide moves along the track as the spool rotates to guide the cord into the proper channel. The reel further contains a biasing spring to provide a force to wind the cord and a ratchet assembly to hold the cord in a desired position against the force applied by the biasing spring. Finally, the reel contains an electrical contact assembly which enables the portion of the cord on the spool to rotate freely from the portion of the cord running to the telephone base.

5 Claims, 2 Drawing Sheets

TELEPHONE CORD REEL

FIELD OF THE INVENTION

This invention relates to telephone cord reels. More specifically, this invention relates to telephone cord reels particularly suited for use in airplanes, motor vehicles, and other places where space is limited.

BACKGROUND OF THE INVENTION

A reel is a cylinder which turns on it axis and is used for winding rope, cord, wire, or other flexible line material. A reel enables long lengths of line to be stored compactly and also reduces or eliminates tangling of the line. In some reels, e.g., fishing reels, one end of the line is attached to the reel while the other end is unwound. In other reels, e.g., electrical and telephone cord reels, one end of the line is attached to an object other than the reel itself while the other end is unwound. In reels of the latter type, the line tends to twist and tangle as it is unwound because the stationary end of the line is not free to rotate with the line on the reel. A number of reels have been disclosed to reduce this twisting of the line.

Hite, U.S. Pat. No. 1,397,633, issued Nov. 22, 1921, discloses a reel for electrical cord having two or more conducting wires. The spool in the Hite reel contains an interior helical torsional spring which provides a force to turn the spool (and thereby wind the cord) when the cord is unwound from the reel. A ratchet mechanism prevents unwanted winding. The reel also contains an electrical contact assembly between the portion of the cord on the spool and the portion of the cord running from the reel to an electrical outlet. The purpose of the electrical contact assembly is to reduce the twisting of the cord as it is unwound by enabling the portion of the cord on the spool to rotate freely from the portion of the cord running to the outlet. The electrical contact assembly comprises a collar of conducting material, which is connected to a wire of the cord on the spool and rotates with it. This collar rubs against a stationary conducting member connected to a wire of the cord going to the outlet. A separate collar/conducting member is used for each conducting wire in the cord.

Ditzig, U.S. Pat. No. 5,156,242, issued Oct. 20, 1992, discloses a telephone cord reel similar to the Hite reel. The Ditzig reel differs by using a spool with helical channels on its outer surface (rather than a spool with a smooth surface), by employing a helical spring which can be selectively loaded (rather than a spring which is loaded a fixed amount), and by preventing the unwanted winding of the cord by frictional contact between the cord and the housing (rather than with a ratchet mechanism).

Technology has advanced to the point that telephones in airplanes, motor vehicles, and other means of transportation are becoming common. In such locations, space is limited and the use of a telephone cord reel is desirable. The Ditzig reel is satisfactory, but suffers from the several disadvantages. First, the cord can be unwound only in a direction perpendicular to the spool: it would be desirable if the cord could be unwound at any angle from parallel to perpendicular. Second, the Ditzig reel has no means for guiding the cord into the adjacent helical channel of the spool. As a result, the cord occasionally tangles on the spool. Third, the Ditzig reel lacks any means to prevent the cord from unwinding if a sudden deceleration occurs. A rapid, uncontrolled unwinding of a telephone handset upon sudden stopping (as occurs occasionally in airplanes and motor vehicles) is dangerous to passengers nearby. Accordingly, a demand exists for an improved telephone cord reel which is particularly suited for use in airplanes, motor vehicles, and other places where space is limited.

SUMMARY OF THE INVENTION

A general object of this invention is to provide an improved telephone cord reel. More particular objects are to provide a telephone cord reel from which the cord can be unwound at any angle from parallel to perpendicular, which ensures the cord is wound onto the spool without tangling, and which eliminates the possibility of undesired unwinding if a sudden deceleration occurs.

I have invented an improved telephone cord reel. The reel comprises: (a) a first section of telephone cord having at least one conductor, which section unwinds from the reel and is adapted for connection to a telephone handset; (b) a second section of telephone cord which is adapted for connection to a telephone outlet; (c) a hollow cylindrical spool around which the cord winds and unwinds as the spool rotates, the spool having helical channels on its outer surface, the channels being of a size such that the cord fits into the channels; (d) a housing for the spool having a slot running substantially the length of the spool and having supports for the ends of the spool; (e) a cord guide assembly for guiding the cord into the channels as it is wound, the assembly comprising: (i) a track running substantially the length of the spool and mounted in a fixed position a uniform distance from the spool; and (ii) a cord guide adapted to ride along the track, having an opening through which the cord passes, and having a protrusion which engages the helical channels of the spool, such that the cord guide moves along the track as the spool rotates; (f) a helical torsional spring inside the spool, one end of which is engaged to the spool and rotates with it, the other end of which is not engaged to the spool and does not rotate with it, such that the spring provides a force to rotate the spool and rewind the cord when the cord is unwound; (g) a means for releasably holding the cord in a fixed position when it is unwound; and (h) an electrical contact assembly for transmitting electricity from the terminal end of the cord to the portion of the cord wound on the spool, the assembly comprising a coil spring for each conductor in the cord, the inner end of each coil spring connected to a conductor of the portion of the cord wound on the spool, the outer end of each spring connected to a conductor of the outlet end of the cord, such that the coil spring uncoils and recoils as the spool rotates.

The telephone cord reel of this invention is particularly suited for use in airplanes, motor vehicles, and other such places where space is limited for several reasons. First, the reel is compact: a relatively long section of cord can be stored in a small space. Second, the reel permits the cord to be unwound through a wide range of angles. Third, the reel prevents tangling of the cord on the spool. And fourth, the reel eliminates the possibility of undesired unwinding if a sudden deceleration occurs.

DETAILED DESCRIPTION OF THE INVENTION

Figure 1:
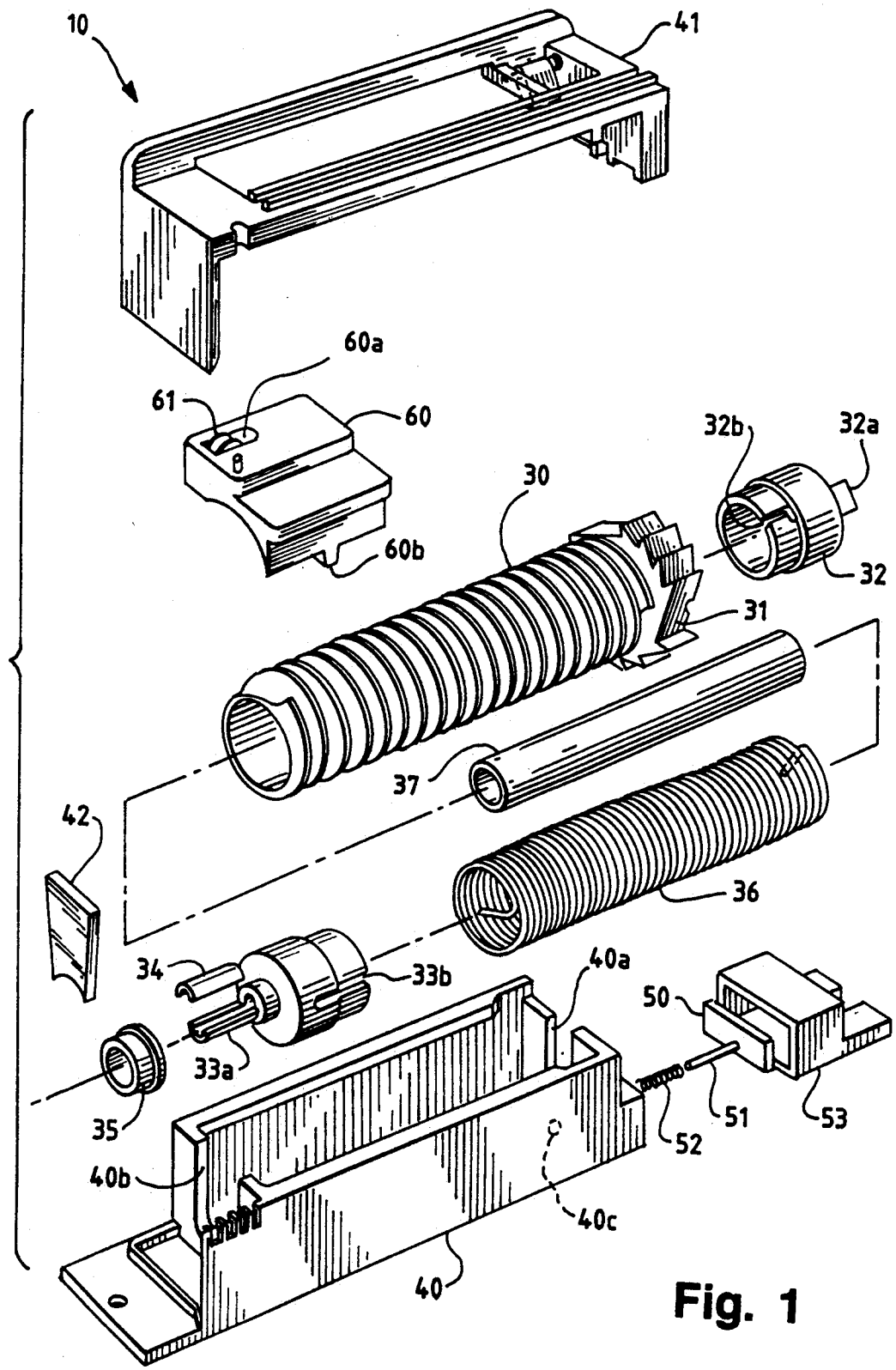
FIG. 1 is a perspective, exploded view of one embodiment of the telephone cord reel of this invention.
Figure 2:
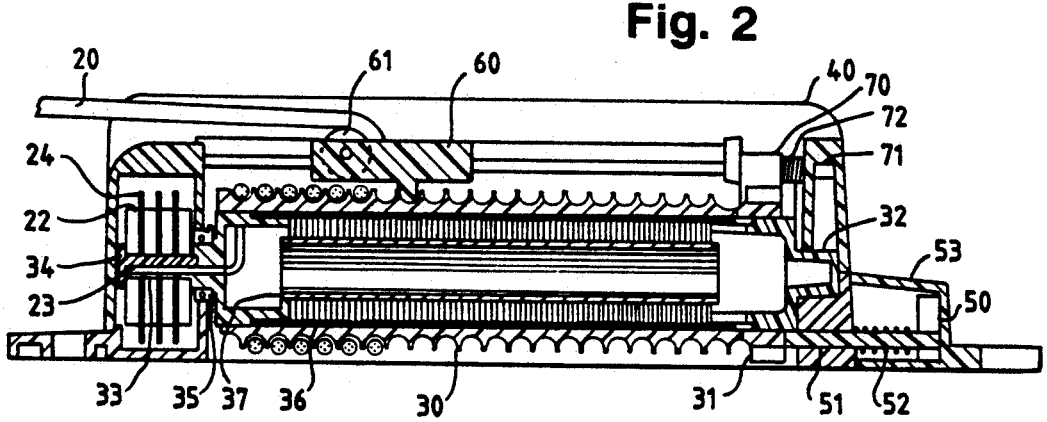
FIG. 2 is a longitudinal, sectional view of the telephone cord reel.

This invention is best understood by reference to the drawings. A preferred embodiment of the telephone cord reel 10 of this invention is shown in FIGS. 1 and 2. The cord and the electrical contact assembly are omitted from FIG. 1 for clarity and are shown in separate detail in FIG. 3. The reel contains two sections of telephone cord having four conducting wires within an outer covering. The first section 20 is wound on a spool 30 and is connected to the telephone handset (not shown). The second section 21 is connected to a telephone outlet (not shown), a telephone base, or other terminal connection. The cord generally has an outside diameter of about 0.05 to 0.2 inches. The length of the first section of cord is sufficient to reach from the reel to the head of the person using the telephone, generally about 20 to 60 inches. The sections of cord communicate with one another through an electrical contact assembly, discussed in detail below.

The spool is hollow and contains helical channels on its outer surface. The channels are of such a size and shape that one, and only one, length of cord fits into them. The rear end of the spool contains a crown gear 31 with helical teeth and a number of indentations on its end, the function of which is explained below. The crown gear is, alternatively, a separate component which is fastened to, and rotates with, the spool. The spool generally has a length of about 2 to 5 inches and an outside diameter of about 0.5 to 2 inches. The spool is preferably made of a non-conducting, lightweight material such as nylon. It is enclosed within a lower housing 40 and an upper housing 41.

A hub is inserted into each end of the spool. The rear end of the spool contains a hub 32 which turns freely inside the spool and which contains an end 32a having a square cross section. This rear hub rests in a matching square opening 40a of the lower housing. The front end of the spool contains a hub 33 which frictionally engages, and rotates with, the spool and which contains an end having a round cross section. The end of the front hub is made of two pieces, 33a and 34, which are glued together. This hub fits into a bearing 35 which, in turn, rests in a round opening 40b of the lower housing. The bearing is held in place by plug 42 which is glued, or otherwise secured, into position.

A helical torsional spring 36 is positioned inside the spool. The diameter of the spring is preferably equal to, or slightly less than, the inside diameter of the spool. The two ends of the spring are secured to the two hubs by means of slots, 32b and 33b, in the hubs. The spring is preferably wound a number of times before being connected to the hubs to increase its torque. A tube 37 rests inside the spring to prevent it from twisting over upon itself when tightly wound. When the spool rotates, the rear hub remains fixed (as does the end of the spring attached to the rear hub). Meanwhile, the front hub rotates with the spool (as does the end of the spring attached to the front hub). It can thus be seen that, when the telephone cord is unwound from the spool, the spring exerts a force to rotate the spool in the opposite direction to rewind the cord.

The upper housing contains a longitudinal slot through which the telephone cord exits the reel for connection to the handset. The upper and lower housings are secured together and perform a number of functions in the reel. First, they shield the spool and related parts from outside contact. Second, they provide a convenient means for mounting the reel in a desired position in the airplane or motor vehicle. For example, in a commercial airline, the reel is preferably mounted upside-down under an armrest. Third, the housings support the spool, as described above, and the cord guide, as described below.

An inertial brake assembly prevents undesired unwinding of the cord if a sudden deceleration occurs. The assembly includes a weight 50 and a pin 51 which is attached to the weight and passes through opening 40c in the lower housing. The pin is normally held out of contact with the crown gear on the spool by the action of a brake spring 52. The pin is held in place by cover 53 which is glued onto the rear of the lower housing. If a sudden force is applied in a direction toward the front of the reel (where the handset is located), the spring is compressed by the weight and the pin engages indentations 31b in the end of the crown gear, thus preventing rotation of the spool and eliminating the danger of a flying handset.

Mounted inside the two housings is a cord guide 60 which travels transversely along a track defined by gaps between the two housings. The cord guide thus maintains a uniform distance from the spool. The cord guide contains an opening 60a through which the cord passes. A pulley 61 reduces friction between the cord guide and the cord. A protrusion 60b extends in the direction of the spool and has a length and shape such that it engages the helical channels of the spool. The cord opening and the protrusion are preferably adjacent each other perpendicular to the longitudinal line of the spool. As the spool turns, the rotating helical channels move the cord guide back and forth on the track along the length of the spool. The cord guide, in turn, ensures that the cord is directed so that it is evenly wound onto the spool. The cord guide also enables the cord to be unwound from the reel throughout a wide range of angles. As seen in FIG. 2, the cord can be unwound at an angle of zero degrees to the spool, i.e., the cord and the spool are parallel. The cord can also be unwound at an angle of 90 degrees or more to the spool.

Figure 3:
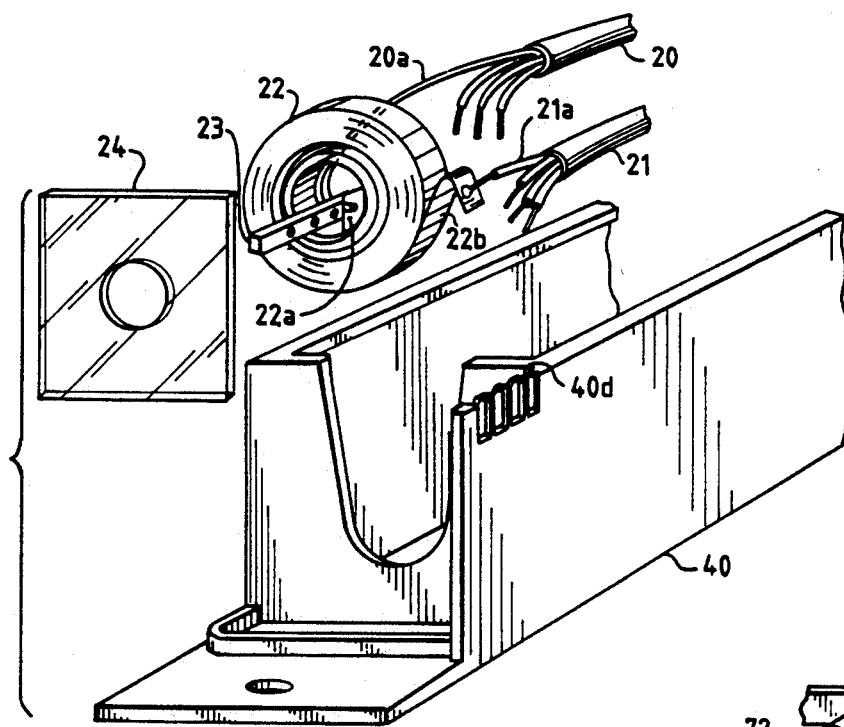
FIG. 3 is a perspective, exploded view of a portion of the electrical contact assembly of the telephone cord reel.

An electrical contact assembly transmits electricity from the terminal end of the cord to the portion of the cord wound on the spool. Referring to FIG. 3, each separate conductor in the cord has associated with it a coil spring 22 which rests in a notch 40d of the lower housing and is held in place by the upper housing. For clarity, only one coil spring is shown in FIG. 3. The inner end of the coil spring 22a is connected to a circuit card 23 which is, in turn, connected to a conductor 20a of the portion of the cord wound on the spool. As seen in FIG. 2, the circuit card fits into a space in the front hub. The circuit card simplifies assembly, but is not essential to the functioning of the device. In other words, the inner end of the coil spring can be connected directly to the conductor. The outer end of the coil spring 22b is connected to a conductor 21a of the terminal end of the cord. It can be seen that, when the spool rotates in a clockwise direction (as viewed in FIG. 3), the cord on the spool rotates as well and the inner end of the coil spring coils more tightly. Thus, electrical contact is maintained between the two sections of cord. An insulator sheet 24 separates the coil spring from adjacent coil springs.

Figure 4:
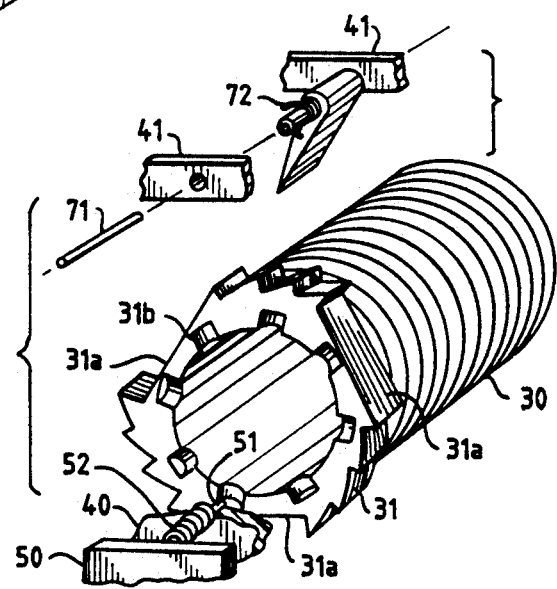
FIG. 4 is a perspective, exploded view of the ratchet assembly of the telephone cord reel.

The reel contains a ratchet assembly as a means for holding the cord in a fixed position when it is unwound. The ratchet assembly is shown in detail in FIG. 4. The ratchet assembly includes the crown gear of the spool, a ratchet dog 70 which engages the teeth of the crown gear, a pin 71 which holds the ratchet dog in place in the upper housing, and a ratchet dog spring 72 which forces the ratchet dog in a clockwise direction (as viewed in FIG. 4). When the spool is unwound, the spool rotates in a counter-clockwise direction and the teeth of the crown gear pass over the ratchet dog. When the spool is unwound a desired amount, the spool rotates clockwise a very small amount before engaging the ratchet dog. Further clockwise rotation is thus prevented. If it is desired to completely wind the cord back on the reel, the cord is pulled slightly so that the ratchet dog encounters one of the three spaces 31a. The spaces are of a sufficiently small diameter that the ratchet dog flips pass the teeth into a position out of contact with the teeth.

It is preferred that the reel include means for limiting the amount of cord which is unwound. Without such a limiter, there is a possibility of breaking the connections of the conductors and/or of jamming reel. A simple, but effective, limiting means is a protrusion on the cord guide which contacts a protrusion on the spool at the desired point of limitation.

I claim:

1. A telephone cord reel comprising:
   (a) a first section of telephone cord having at least one conductor, which section unwinds from the reel and is adapted for connection to a telephone handset;
   (b) a second section of telephone cord which is adapted for connection to a telephone outlet;
   (c) a hollow cylindrical spool around which the cord winds and unwinds as the spool rotates, the spool having helical channels on its outer surface, the channels being of a size such that the cord fits into the channels;
   (d) a housing for the spool having a slot running substantially the length of the spool and having supports for the ends of the spool;
   (e) a cord guide assembly for guiding the cord into the channels as it is wound, the assembly comprising: (i) a track running substantially the length of the spool and mounted in a fixed position a uniform distance from the spool; and (ii) a cord guide adapted to ride along the track, having an opening through which the cord passes, and having a protrusion which engages the helical channels of the spool, such that the cord guide moves along the track as the spool rotates;
   (f) a helical torsional spring inside the spool, one end of which is engaged to the spool and rotates with it, the other end of which is not engaged to the spool and does not rotate with it, such that the spring provides a force to rotate the spool and rewind the cord when the cord is unwound;
   (g) a means for releasably holding the cord in a fixed position when it is unwound; and
   (h) an electrical contact assembly for transmitting electricity from the outlet end of the cord to the portion of the cord wound on the spool, the assembly comprising a coil spring for each separate conductor in the cord, the inner end of each coil spring connected to a conductor of the portion of the cord wound on the spool, the outer end of each spring connected to a conductor of the outlet end of the cord, such that the coil spring uncoils and recoils as the spool rotates.

2. The telephone cord reel of claim 1 additionally comprising:
   (i) a means for preventing the unwinding of the cord when the reel is subjected to a rapid deceleration.

3. The telephone cord reel of claim 2 wherein the means for releasably holding the cord in a fixed position when it is unwound comprises a ratchet assembly.

4. The telephone cord reel of claim 3 wherein the ratchet assembly comprises a crown gear on the spool and a ratchet dog which engages teeth of the crown gear.

5. The telephone cord reel of claim 4 wherein the means for preventing unwinding comprises an elongated member which is normally held in a position away from the spool by a helical compression spring and which moves against the spring and into a position engaging the crown gear when the reel is subjected to a rapid deceleration.

* * * * *